(12) United States Patent
Kallabis et al.

(10) Patent No.: US 10,267,633 B2
(45) Date of Patent: Apr. 23, 2019

(54) LEVEL

(71) Applicant: STABILA MESSGERÄTE GUSTAV ULLRICH GMBH, Annweiler (DE)

(72) Inventors: Gabriel Kallabis, Spirkelbach (DE); Thorsten Setzer, Annweiler (DE)

(73) Assignee: STABILA MESSGERÄTE GUSTAV ULLRICH GMBH, Annweiler (DE)

( * ) Notice: Subject to any disclaimer, the term of this patent is extended or adjusted under 35 U.S.C. 154(b) by 115 days.

(21) Appl. No.: 15/426,259

(22) Filed: Feb. 7, 2017

(65) Prior Publication Data
US 2017/0227359 A1 Aug. 10, 2017

(30) Foreign Application Priority Data

Feb. 9, 2016 (DE) .................. 10 2016 102 210
Feb. 25, 2016 (DE) .................. 10 2016 103 334

(51) Int. Cl.
*G01C 9/28* (2006.01)
(52) U.S. Cl.
CPC ..................... *G01C 9/28* (2013.01)
(58) Field of Classification Search
CPC .... G01B 3/08; G01C 9/26; G01C 9/28; F16B 7/14
USPC .......................................... 33/374, 464, 809
See application file for complete search history.

(56) References Cited

U.S. PATENT DOCUMENTS

| 149,532 A | 4/1874 | Sherwin | |
| 684,846 A * | 10/1901 | Moss .................. | G01C 9/28 33/374 |
| 2,419,451 A | 4/1947 | Keller | |
| 3,648,378 A * | 3/1972 | Thingstad et al. ........ | G01C 9/34 33/374 |
| 4,130,943 A * | 12/1978 | Talbot ...................... | G01C 9/28 33/374 |
| 4,894,925 A * | 1/1990 | Langmaid ................ | G01C 9/28 33/374 |
| 6,041,510 A * | 3/2000 | Huff ......................... | G01B 3/02 33/374 |

(Continued)

FOREIGN PATENT DOCUMENTS

| CN | 201259421 Y | 6/2009 |
| DE | 196 05 868 A1 | 8/1997 |

(Continued)

OTHER PUBLICATIONS

Non-English German Office Action dated Oct. 31, 2016 for German Application No. 10 2016 103 334.0.

(Continued)

*Primary Examiner* — R. A. Smith
(74) *Attorney, Agent, or Firm* — Ladas & Parry LLP; Malcolm J. MacDonald

(57) ABSTRACT

A spirit level (10) having a base body (12) with a first measuring sole (52) and a runner element (14) with a second measuring sole (54), being connected to the latter and able to move relative to it in its longitudinal direction, wherein the first and the second measuring sole run at the same level. In order to accomplish a low-friction displacement, that a first sliding element (26) emerges from the base body (12), which interacts by form fitting with the runner element (14) for a section and applies force to it in or approximately in the normal direction of the measuring soles (52, 54), and a second sliding element (28) emerges from the runner, which interacts by form fitting with the base body for a section and applies force to the runner element in or approximately in the direction of the measuring soles.

28 Claims, 5 Drawing Sheets

(56) References Cited

U.S. PATENT DOCUMENTS

| | | | | |
|---|---|---|---|---|
| 6,047,478 A | * | 4/2000 | Sowers | G01C 9/26 33/374 |
| 6,293,023 B1 | * | 9/2001 | Schooley | G01C 9/28 33/374 |
| 6,658,752 B1 | | 12/2003 | Bonaventura, Jr. | |
| 6,694,632 B1 | * | 2/2004 | Schooley | G01C 9/28 33/374 |
| 6,915,585 B2 | | 7/2005 | Von Wedemeyer | |
| 2002/0121026 A1 | | 9/2002 | Pustay | |
| 2013/0326895 A1 | | 12/2013 | Bureau | |

FOREIGN PATENT DOCUMENTS

| | | | |
|---|---|---|---|
| DE | 298 02 257 U1 | 7/1999 | |
| DE | 200 22 165 U1 | 6/2001 | |
| DE | 201 09 656 U1 | 11/2002 | |
| GB | 2371583 A * | 7/2002 | G01C 9/28 |
| WO | 85/02660 A1 | 6/1985 | |

OTHER PUBLICATIONS

Espacenet English abstract of DE 196 05 868 A1.
Espacenet English abstract of DE 10102445 A1 which corresponds to DE 200 22 165 U1.
Espacenet English abstract of CN 201259421 Y.
English translation of DE 298 02 257 U1.
European Search Report for EP Application No. 17155186.4, dated Nov. 15, 2017.

* cited by examiner

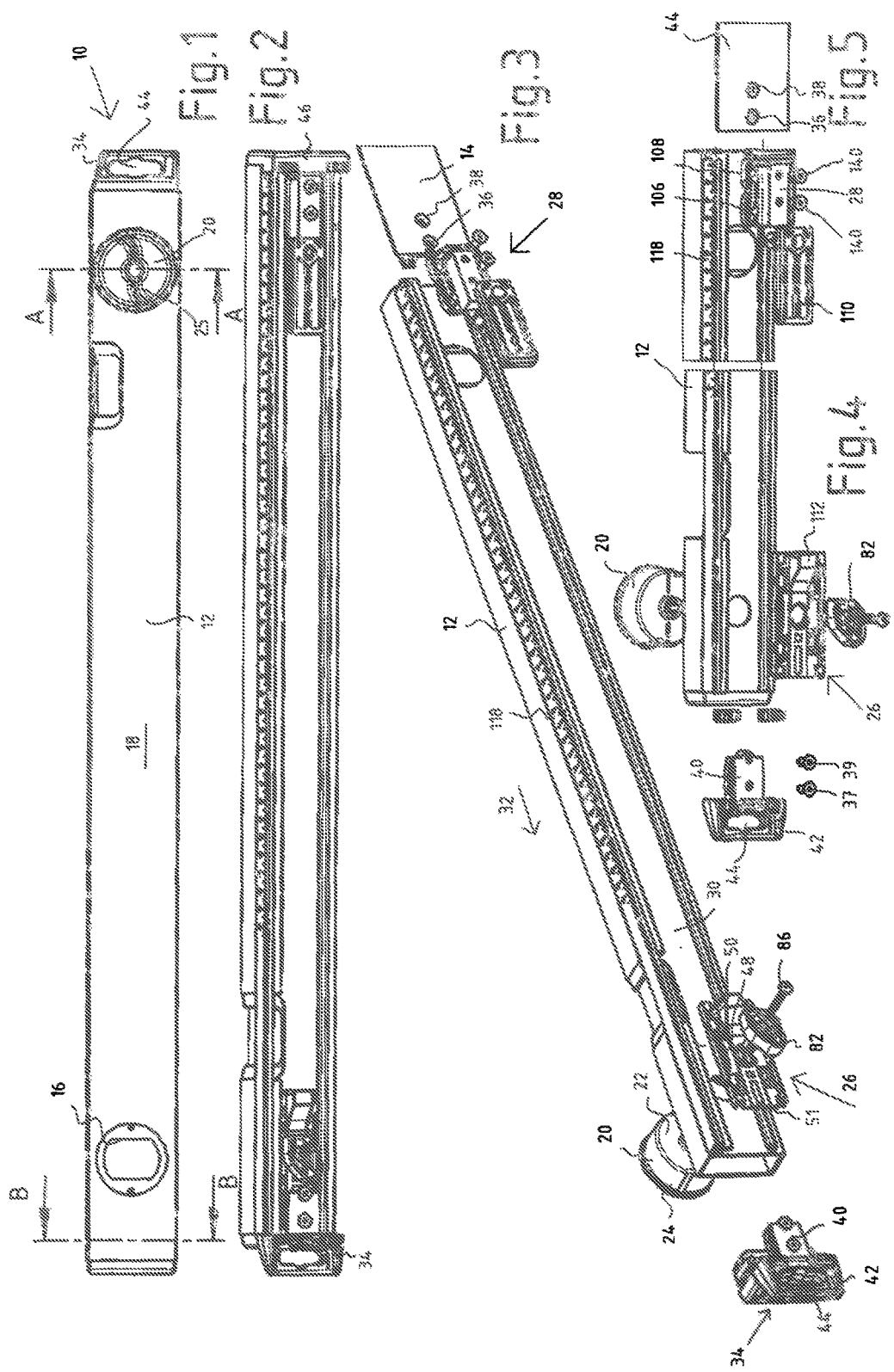

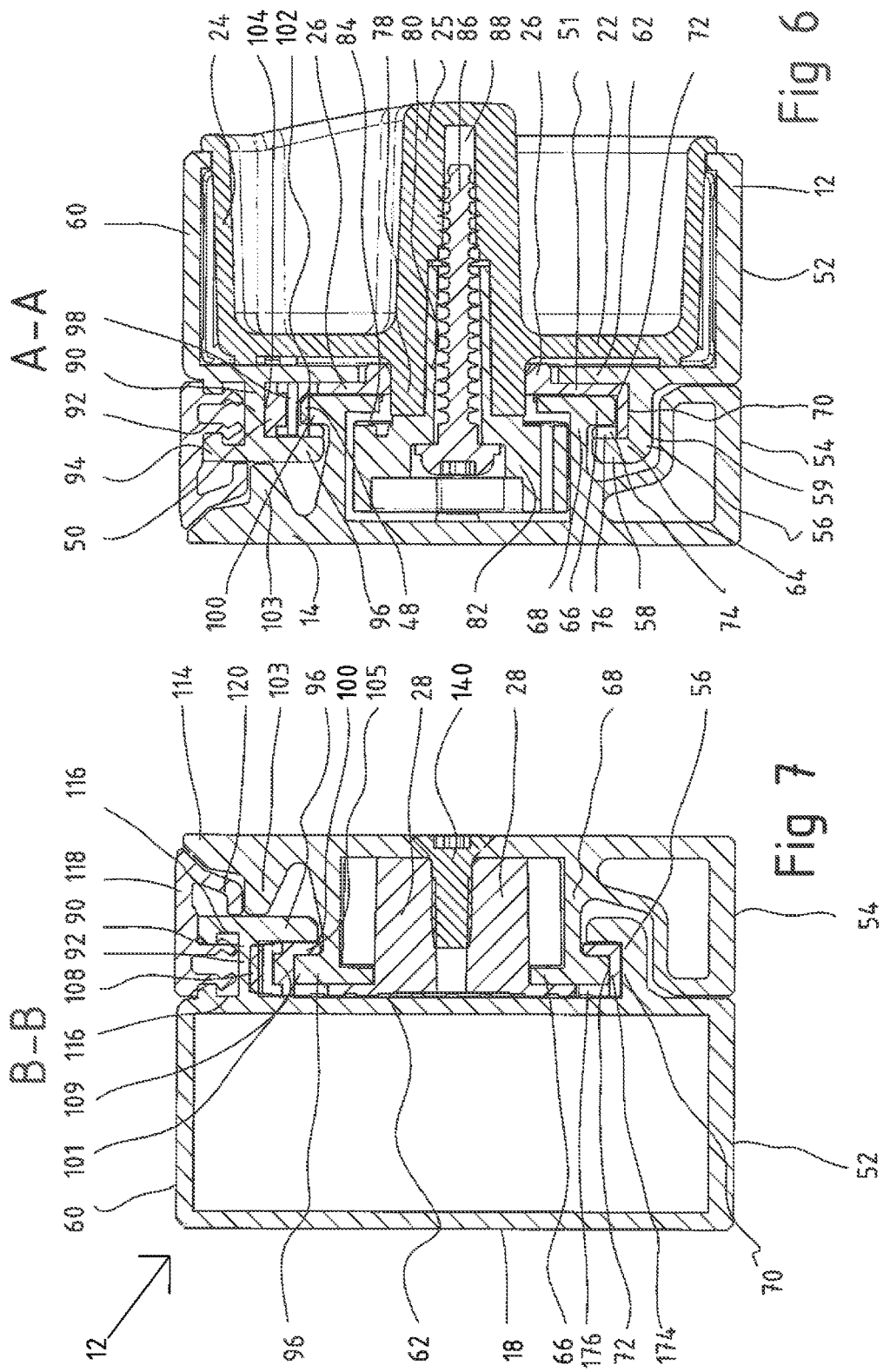

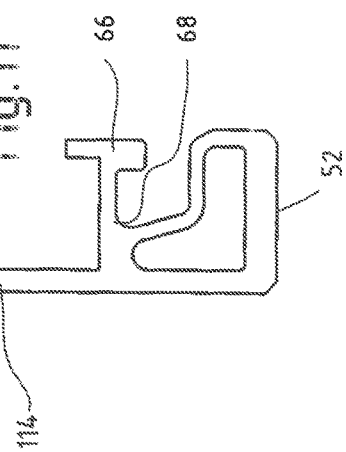

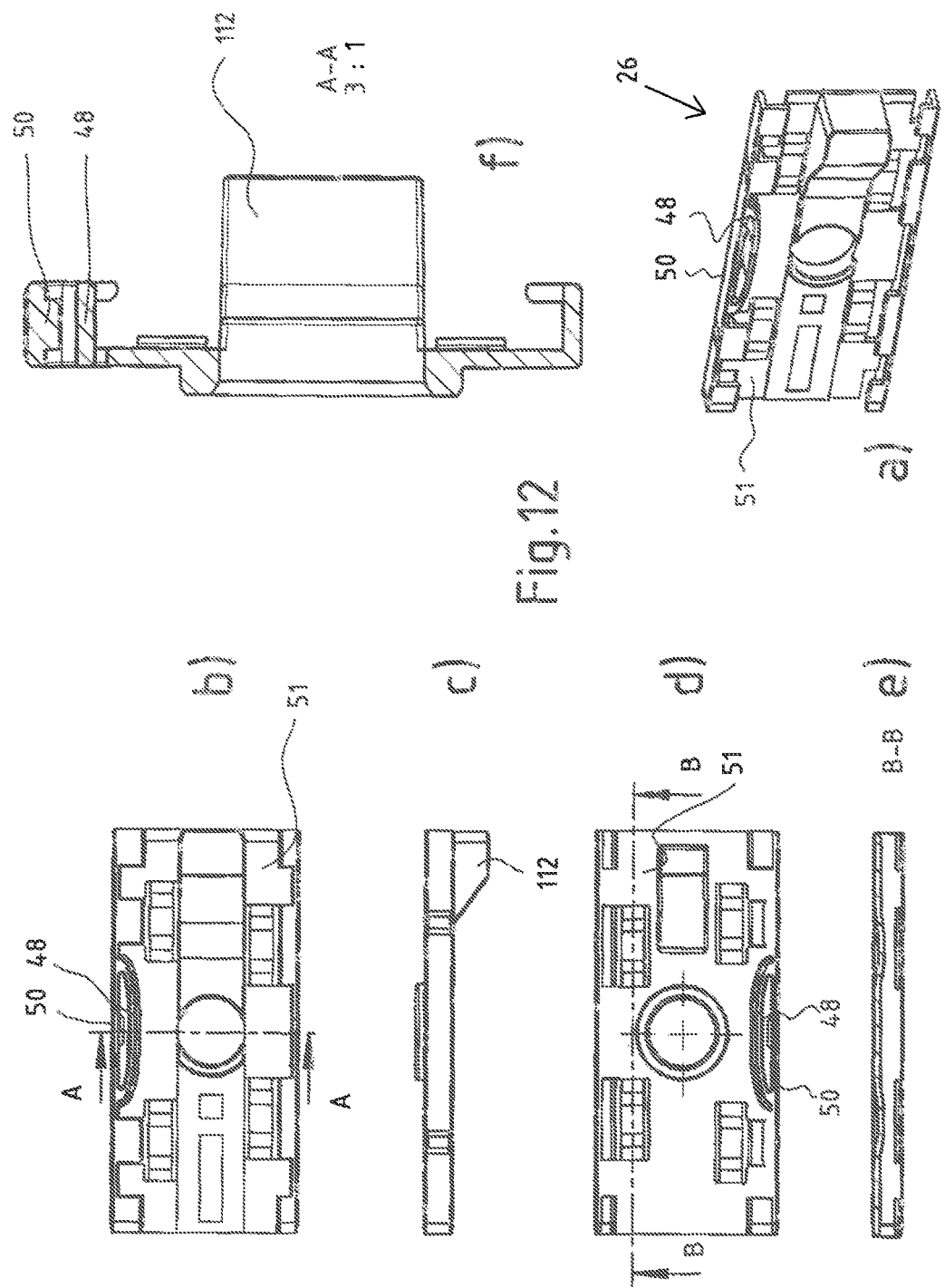

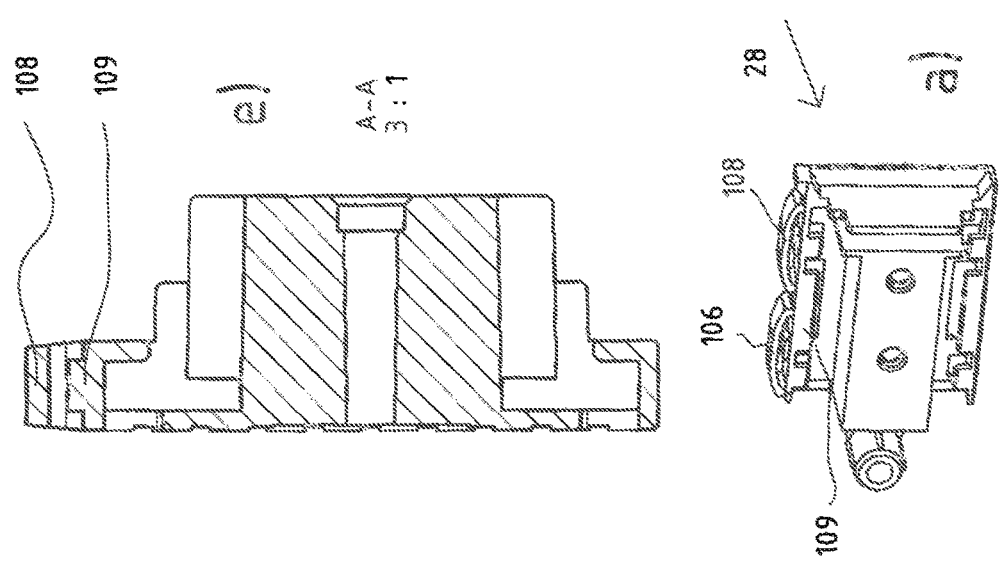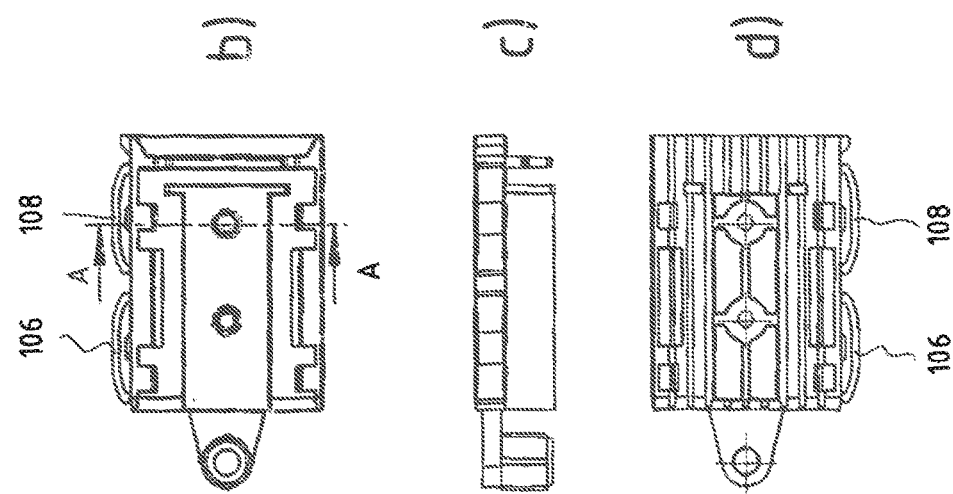
Fig. 13

LEVEL

The invention concerns a spirit level comprising a base body with a first measuring sole and a runner element with a second measuring sole being connected to the latter and able to move relative to it in its longitudinal direction, wherein the first and the second measuring sole run at the same level, that is, they run in a common plane, when the spirit level is used.

Such extensible or telescoping spirit levels afford the possibility of performing a lining up on lengths extending beyond the base body. The runner element used for this can be a profile element which is movable in the base body, having a cross geometry in cross section, as specified by DE 196 05 868 A1. A similar design is found in DE 200 22 165 U1. In place of a cross profile, an H profile is used.

A length-adjustable spirit level according to U.S. Pat. No. 2,419,451 A calls for the base body and runner element to be connected to each other by a kind of dovetail joint. A similar design is found in the extensible spirit level of U.S. Pat. No. 149,532 A. Other extensible spirit levels will be found, e.g., in U.S. Pat. No. 6,658,752 B1 or US 2002/0121026 A1.

DE 201 09 656 U1 pertains to a telescopic spirit level, having a spring element to make possible a lining up of an extensible profile element with a second profile element that extends inside the first profile element.

The subject matter of CN 201 259 421 Y is a telescopic spirit level, allowing the structural parts to be retracted by spring elements.

U.S. Pat. No. 684,846 A proposes a spirit level with a runner, whose measuring sole is on the same level as the base body.

The drawback of the previously known extensible or telescopic spirit levels is that the structural elements able to move relative to each other, i.e., the base body and runner element, make such contact with each other during the movement that a desirable freedom of movement is not possible, especially if dust or dirt become deposited in the region in which the structural elements are supposed to slide on one another.

From DE 298 02 257 U1 there is known an angle measuring device with two legs, one leg having an extension rail, whose bearing surface runs at an offset from that of the leg. The extension rail has a U-shaped geometry with interior projections in the form of leaf springs which are braced against the leg.

The problem which the present invention proposes to solve is to modify a spirit level of the kind mentioned above so that an easy movement of the base body and runner element relative to each other is possible. At the same time, it should be assured that the measuring soles are lined up on the same level, in particular always on the same level, i.e., they run in a common plane, when the spirit level is used.

In order to solve the problem, the invention substantially calls for a first sliding element emerges from the base body, which interacts by form fitting with the runner element for a section and applies force to it in the direction of the measuring sole, and for a second sliding element to emerge from the runner, which interacts by form fitting with the base body for a section and applies force to the runner element in the direction of the measuring sole.

In particular, it is provided that the first and the second sliding element each have at least one spring element and/or at least one section with spring properties for the applying of force to the runner element in the normal direction to the measuring sole, or approximately in that direction.

According to the invention, sliding elements are used which substantially brace the base body and runner element against each other to an extent enabling a relative movement to each other with no problems. Besides this sliding role, however, the sliding elements also have a guiding role, such that a force is always applied to the runner element regardless of its position in the direction of the measuring sole to such an extent that the measuring soles are lined up at the same level relative to each other.

The first and the second sliding element each have at least one spring element and/or at least one section having spring properties for the application of force to the runner element in the direction of the measuring sole. In particular, it is provided that the sliding element itself produces the action of the force by at least one section. This is possible in particular when the sliding element is plastic—such as an injection-molded plastic part—in which a section is shaped so that it can generate the desired spring action.

Because the sliding element interacts by form-fitting at least for a section with the runner element and the base body, there is the advantage that a direct bearing of surfaces of the base body and the runner element which run perpendicular to the lateral surfaces of the spirit level is not required. Thus, there can be a distance between immediately neighboring surfaces running perpendicular to the lateral surfaces, which ensures an easy mobility. A section of the sliding elements can run in the intervening space. The features in this regard constitute an inventive step in themselves.

In a modification of the design solution which enables a displacement of the base body and runner element with respect to each other, the invention calls for a first protrusion emerging from the base body and extending at least in its longitudinal direction, which engages with a second protrusion emerging from the runner element and extending in its longitudinal direction, and a section of the first and/or second sliding element extends at least partly between overlapping regions of the first and second protrusion.

Moreover, it can be provided that a third protrusion emerges from the base body, running parallel to the first protrusion, which engages with a fourth protrusion running parallel to the second protrusion and emerging from the runner element, and a further section of the first and/or second sliding element extends at least partly between overlapping regions of the third and fourth protrusion. These provisions ensure a secure alignment and connection of runner element and base body, while at the same time the sliding element or the sliding elements produce a spacing apart in the overlapping regions, which ensures the easy displaceability.

In particular, the first or third protrusion is an L-profile section of the base body or the third or first protrusion is a T-shaped profile section with transverse leg running parallel to the outer lateral surface of the base body.

The second and/or fourth protrusion can be a T-shaped profile section of the runner element, while the transverse leg runs parallel to the outer lateral surface of the runner profile.

Moreover, the long legs of the second and fourth protrusions and the facing leg sections of their transverse legs should bound a channel-shaped section. Inside the channel-shaped section there can be arranged a cam, by means of which the runner element can be fixed relative to the base body, so that a lengthwise displacement is no longer possible.

Therefore, the invention provides in particular that an activating element emerges from the base body, which is connected to the cam element, running for a section inside the channel-shaped section running in the longitudinal direction of the spirit level.

When the runner element is fixed by the cam, the cam element exerts a force on the runner element in the direction of the measuring sole or surface, so that the equal level is preserved or ensured. Thus, the runner element cannot be moved in the direction of the spring element or the section of the first sliding element having spring properties within which the cam element extends for a section.

Moreover, it is provided in particular that the activating element is a rotatable cup-shaped element with a handle such as a radially extending web, which emerges from an exterior lateral surface of the base body and in particular is recessed in its side wall to an extent which does not impair the use of the spirit level as compared to those which are not length-adjustable. Therefore, the activating element should substantially be recessed entirely in the base body or only protrude for a short distance, such as 1 mm to 2 mm, beyond its outer lateral surface.

Moreover, the cam should be configured so that when the activating element is rotated by at most 180°, preferably in the range between 45° and 90°, the cam is moved such that the runner element can no longer be displaced or it is released.

In order to simplify the design, the cam element can run for a portion inside the first sliding element and can then rotate relative to it.

In a modification it is provided that the section at the measuring sole side of the transverse leg of the second protrusion, having a T-shape and sticking out from the inner surface of the runner element, bounds a second channel-shaped section with an L cross section, inside which the first protrusion emerging from the base body extends.

Moreover, in a modification the invention calls for a fifth protrusion extending from the runner element in the direction of the base body and running in the head region of the spirit level, being oriented toward the outside of the third protrusion of the base body at the head side and resting against it. This assures a definite spacing between runner element and base body.

In order to detect by how much the runner element has been moved relative to the base body, i.e., to ascertain the effective length of the spirit level, a further proposal of the invention calls for a striplike element preferably having scale markings to be provided in the head region of the spirit level, which is supported by the base body and closes off the free space present between the runner element and the base body. The strip element can be secured by clamping in a channel-shaped section of the base body. The channel-shaped section is bounded in this case by a marginal segment of the inner lateral surface of the base body at the head side, the long leg of the third protrusion, and the segment of the transverse leg of the third protrusion at the head side.

Between the head-side outer surface of the fifth protrusion and the outside of the head-side leg segment of the third protrusion as well as the edge-side inner surface of the runner element there extends an additional channel-shaped section, into which a section of the strip element protrudes.

In order to limit the displacement of the runner element relative to the base body, i.e., prevent an unintentional release, the invention furthermore calls for the first and/or second sliding element having an end stop limiting the lengthwise displacement of the runner element. In particular, it is provided that a spacer emerges from the runner element—preferably connected to the second sliding element—and interacts with the end stop emerging from the first sliding element at the maximum desired effective length of the spirit level. Of course, the second sliding element can interact with the end stop without such a spacer. Neither is it absolutely necessary for the end stop to emerge from the first sliding element. Instead, it can be a separate structural part. The features in this regard are to be viewed as have the identical effect.

In one embodiment of the invention it is proposed that the at least one spring element or the at least one section of the second sliding element having a spring action acts directly on the long leg of the head-side third protrusion. Furthermore, the at least one spring element or the at least one section of the first sliding element having a spring action can act directly on the head-side segment of the transverse leg of the fourth protrusion, while a weblike section of the first sliding element running in the lengthwise direction of the spirit level at a spacing from the spring element or the section having the spring action bears against the side away from the head of the long leg of the head-side third protrusion. This ensures the required application of force to the runner element, since the sliding element on the one hand bears against a section of the base body and the spring element or the section having a spring action bears against the runner element.

In order to be able to move the runner element with no problem, one modification of the invention calls for the runner element being connected to an end cap serving as a handle, which can be inserted for a portion into the base body and be pulled out from it.

In order to make sure that the measuring soles of the base body and the runner element run at the same level, i.e., in the identical plane, the invention is furthermore characterized by a method for producing a spirit level comprising a base body with a first measuring sole and a runner element with a second measuring sole, being connected to the latter and able to move relative to it in its longitudinal direction, wherein the first and the second measuring sole run at the same level, in that the base body and the runner element are first of all assembled and then their measuring soles are machined jointly.

The machining is done here preferably by milling. This provision ensures that the finished spirit level has an identical level for the measuring soles. The machining of the measuring soles should be done when the spirit level is not extended, i.e., in particular the base body and the runner element are oriented flush or substantially flush with each other at the end face.

Further details, benefits and features of the invention will emerge not only from the claims and the features found therein—along and/or in combination—but also from the following description of sample embodiments to be found in the drawing.

There are shown:

FIG. 1 a spirit level in front side view,

FIG. 2 the spirit level of FIG. 1 in rear view, without runner element,

FIG. 3 the spirit level of FIGS. 1 and 2 in isometric and exploded representation, FIG. 4 the left end region of the spirit level of FIGS. 1 and 3 in exploded representation, FIG. 5 the right end region of the spirit level of FIG. 1 to 3 in exploded representation, FIG. 6 a section along line A-A in FIG. 1 in enlarged representation, FIG. 7 a section along line B-B in FIG. 1 in enlarged representation, FIG. 8 an interior view of the runner element, FIG. 9 a top view of the runner element of FIG. 8, FIG. 10 an exterior view of the runner element of FIGS. 8 and 9, FIG. 11 a sectional representation of the runner element in enlarged representation.

FIG. 12 a first sliding element in various orientations and

FIG. 13 a second sliding element in various orientations.

In the figures, where basically identical elements are marked with the same reference numbers, distinctive features of an extensible or telescoping spirit level 10 according to the invention are shown, being self-evident especially in regard to FIGS. 6, 7 and 11-13, without the need for further explanations.

The spirit level 10 consists of a base body 12, which in the sample embodiment can be a section of a hollow rectangular profile made of aluminum. Able to move along the base body 12 is a runner element 14, in order to change the measurement length of the spirit level 10 to the desired extent. The runner element 14 can likewise be a section of an extruded aluminum profile, whose geometry is self-explanatory from FIG. 11.

In the base body 12, again in customary fashion, there is provided a bubble tube present in a housing 16 in order to enable a lining up of the spirit level in terms of the horizontal or vertical.

Emerging from the outer lateral surface 18 of the base body 12 or recessed in the base body 12, i.e., in the profile, there is an activating element 20 known as a clamping knob, which has a cup-shaped geometry with disk-like bottom surface 22 or base and a peripheral wall 24 forming a hollow cylinder emerging from this base. Inside the activating element 20 known as the clamping knob and having the cup-shaped geometry is provided a web 25 extending radially from the base surface 22, in order to rotate the clamping knob serving as a handle. By using the clamping knob, the runner element 14 can be released for movement or fixed in the manner described below.

In order to move the runner element 14 with little friction relative to the base body 12, the base body 12 and the runner element 14 have a profiling in mutually facing regions, substantially formed by engaging protrusions, which ensures the lengthwise guidance. In order to make possible a secure guidance, especially a good sliding, according to the invention there are provided sliding elements 26, 28, of which the sliding element 26 as the first sliding element emerges from the inner surface 30 of the base body 12 facing the runner element 14. The second sliding element 28, on the other hand, is joined to the runner element 14.

As appears from the representation of FIG. 3, the first sliding element 26 finds itself in the pull-out direction (arrow 32) of the runner element 14 in the front end of the base body 12, whereas the second sliding element 28 is in the rear region of the runner element 14 connected to it. In order to move the runner element 14, the front end cap 34 which can be inserted into the hollow profile of the base body 12 is connected to the runner element 14. For this, in the sample embodiment, the runner element 14 has two boreholes 36, 38 in its front region, through which screws 37, 39 are passed, which can be screwed together with a tab-shaped section 40 of the front end cap 34 extending in the lengthwise direction of the base body 12.

The end cap 34 has a section 42 with an opening 44, extending in a prolongation of the spirit level 10, in order on the one hand to easily grasp the end cap 34 and thus move the runner element 14 and on the other hand to hang up the spirit level, for example.

In the opposite end region (at the right end in FIG. 2) the spirit level 10 has an end cap 46 which can likewise be inserted into the hollow body of the base body 12 and locked together with it, if desired. The end cap has an extension transverse to the lengthwise axis of the spirit level 10 such that the rear end of the runner element 14 is also covered when the spirit level 10 is not extended.

The essential features of the sliding elements 26 and 28 appear from the sectional representations of FIGS. 6 and 7 as well as FIGS. 12 and 13. In particular, however, it appears from FIGS. 6 and 7 that the base body 12 and the runner element 14 are on the same level in regard to their measuring soles 52, 54, i.e., they extend in the same plane. In order to assure this, especially also when using the spirit level 10 regardless of its effective length, the sliding elements 26, 28 are configured especially in the manner described below or interact with the runner element 14 such that force is applied to the latter in the normal direction to the measuring soles 52, 54.

FIG. 6 (section A-A in FIG. 1) shows the sliding element 26 firmly connected to the base body 12, being indicated by hatch marks and running counterclockwise at a slant from bottom right to upper left. As appears from the sectional representation, the sliding element 26 extends for a portion between sections of the base body 12 and the runner element 14. Moreover, the sliding element 26 has a section 48 acting as a spring element, by means of which the runner element 14 is subjected to force in the normal direction to the measuring soles 52, 54. The section 48 producing the spring force has the function of a leaf spring.

Of course, the invention is not circumvented if the section 48 having a spring action exerts a force on the runner element 14 running only approximately in the normal direction to the measuring soles 52, 54.

In the drawing of FIGS. 3, 4, 6 and 12 *a*), 12 *b*), 12 *f*), a web-shaped section 50 of the sliding element 26 extends above the section 48 generating the spring force, called hereafter the leaf spring for simplicity, and this at a spacing from the spring element 48. The web 50 here is the upper edge of a sheetlike rectangular base section 51 of the sliding element 26.

In order to exert the necessary force on the runner element 14, while at the same time a low-friction movement of the runner element 14 relative to the base body 12 is possible, the sliding element 26 and the mutually engaging profilings of the base body 12 and runner element 14 are configured as follows.

As follows from the sectional representation of FIG. 6, the base body 12 comprises, in its measuring sole region, a first protrusion 56 with an L-shape in cross section, whose vertical leg 58 in the drawing runs in the direction of the head surface or wall 60 of the base body 12. Thus, the inner wall 62 of the profile of the base body 12, the vertically extending leg 58 and a horizontally running leg 59 (in the drawing) of the first protrusion 56 bound off a channel 64, in which a segment 66 of a T-shaped (in cross section) second protrusion 68 engages, emerging from the runner element 14. The first and second protrusion 56, 68 thus overlap each other for a portion.

Between the mutually facing surfaces 70, 72 of the protrusions 56, 68 extending parallel to the measuring soles 52, 54 there extends a section 74 of the first sliding element 26, as indicated by the hatch marks. Furthermore, a section of the sliding element 26 extends for a portion between the vertically extending and overlapping regions of the protrusions 56, 68—being offset relative to the sectional representation A-A. This is illustrated by the surface 76 which is not filled out.

The web 50 running at the top in the drawing is the upper edge of a sheetlike base section 51 of the sliding element 26.

The sectional representation furthermore shows that the base section 51 of the sliding element 26 is pierced by a collar-shaped section 78 of the activating element 20, i.e., the handle or the clamping knob, which receives a projection 80 of a cam 82, extending inside a channel-like recess 84 of the runner element 14. The cam 82 is connected by means of a screw 86 to the clamping knob. For this, the web 25 has a corresponding recess 88 in its middle region, as is indicated self-explanatory in FIG. 6.

Furthermore, from the base body 12 there emerges a third protrusion 90, having a T-shaped cross section with long leg 92 and transverse leg 94. The long leg 92 runs parallel to the measuring sole 52.

The long leg 92 bounds off by the segment 96 of the transverse leg 94 at the measuring sole side and the inner wall 62 of the base body 12 a further channel 98, in which there runs for a portion a fourth protrusion 100 with T-shaped cross section, extending from the inner side of the runner element 14. Thus, the third protrusion 90 and the fourth protrusion 100 likewise engage each other for a portion.

Between the mutually facing surfaces 102 and 104 of the third protrusion 90 and the transverse leg 101 of the fourth protrusion 100, running parallel to the head surface 60, there extend the web-shaped section 50 as well as the leaf spring 48 of the first sliding element 26. The leaf spring 48 acts on the transverse leg 101 of the fourth protrusion 100 and thus exerts a force on the runner element 14 in the direction of the measuring sole 54, namely in its normal direction.

Resting against the outside of the third protrusion 90, i.e., against the transverse leg 94, is a fifth protrusion 103, which emerges from the runner element 14, as illustrated by the drawing.

Thanks to the interaction of the first sliding element 26 with sections of both the base body 12 and the runner element 14, the engaging of the first and second, or the third and fourth protrusions 56, 68, 90, 100, and the piercing of the base element 51 by the collar-shaped section 78 of the activating element 20 or clamping knob, a fixation of the first sliding element 26 results. At the same time, it is ensured that the runner element 14 can only be moved in the longitudinal direction of the base body 12.

Thus, the sliding element 26 at the same time plays the role of a guide element.

The sectional representation of FIG. 7 once more illustrates the interaction of the first and second, or third an fourth protrusions 56, 68, 90, 100. Moreover, one recognizes that the second sliding element 28 is connected to the runner element 14 by screws 140.

The second sliding element 28, which—like the first sliding element 26—has a rectangular geometry, comprises sections 106, 108 acting like a spring on its upper edge, which likewise act as virtual leaf springs and have a skidlike shape in the drawings.

The spring elements 106, 108 rest against the long leg 92 of the third protrusion 90, running parallel to the measuring sole 52.

A U-shaped section 109 (in cross section) of the second sliding element 28 encloses the head-side section of the transverse leg 101 of the fourth protrusion 100, which emerges from the runner element 14. Moreover, one notices from the sectional representation of FIG. 7 that the free outer section 105 (outer side leg) of the U-shaped section 109 runs between the mutually facing surfaces of the segment 96 of the transverse leg 94 of the third protrusion 90 and the leg segment 101 of the fourth protrusion 100 running along the head side. Between the mutually facing surfaces of the inner wall 62 of the base body 12 and the transverse leg 101 of the second and fourth protrusion 68, 100 the second sliding element 28 also extends for a portion. The second sliding element 26 also extends for a portion in the channel 64 bounded by the first protrusion 56 and the second protrusion 68. The corresponding sections are marked with the reference numbers 174, 176, corresponding to the sections of the first sliding section 26.

As for the cam 82 it should be noted that its circumferential geometry is chosen such that the clamping knob or the activating element 20 has to be rotated from the wrist in order to perform a displacement such that the runner element 14 is either fixed or released.

Furthermore, in the sample embodiment a flange piece 110 is connected to the second sliding element 28, extending in the longitudinal direction of the spirit level 10 and interacting with an end stop 112 at maximum extension of the spirit level 10, which stop emerges from the first sliding element 26. In this way, a pulling out of the runner element 14 is prevented. The end stop 112 in the sample embodiment has a ramp-shaped geometry, without this constituting a limitation of the teaching of the invention.

FIG. 11 shows yet again the profile of the runner element 14, which can be a section of an extruded profile made of aluminum. One recognizes the outer wall 114, forming an outer surface of the spirit level 10, from which the second protrusion 68 of T-shaped geometry emerges in the region at the sole side. In the region at the head side, the protrusion 100 of likewise T-shaped geometry and designated as the fourth protrusion emerges. Spaced apart from this protrusion, the fifth protrusion 103 runs along the head side.

Between the wall 114, the long legs of the second and fourth protrusions 68, 100 and the mutually facing segments of the transverse leg is formed the channel in which the cam 82 extends. By rotating the cam 82, this lies against the long leg of the second protrusion 68 or runs at a distance from the long legs of the second and fourth protrusion 68, 100, so that the runner element 14 is fixed or released.

In the fixed positioning of the runner element 14, thanks to the interacting of the cam 82 and the long leg of the second protrusion 68 a force is exerted on the runner element 14 in the direction of its measuring surface or sole 54, which likewise ensures that the measuring soles or surfaces 52, 54 run at the same level. This also ensures when using the spirit level that the runner element 14 cannot be moved against the spring 48 of the sliding element 26.

It emerges from the representations of the drawings that the surfaces of the protrusions 56, 68, 90, 100 from the base body 12 and the runner element 14 running parallel to the measuring soles 52, 54 run at a spacing from each other.

In order to detect the effective length of the spirit level 10, i.e., the extent of the runner element 14 moved relative to the base body 12, it is furthermore provided that a striplike element 118 extending along the head side of the base body 12 is clamped in a channel-shaped seat 116, extending in the head-side region of the base body 12 and bounded by sections of the third protrusion 90 as well as the inner wall 62 of the base body 12, which runs in a prolongation of the top side of the head side 60 of the base body 12 and extends as far as the outer wall 114 of the runner element 14. An L-shaped section 120 (in cross section) of the striplike element 118 extends in the space running between the fifth protrusion 103 and the head-side margin of the outer wall 114. On the outside, the strip element 118 has a scale so that the extended length of the runner element 14 can be read off.

FIGS. 12 and 13 show details of the first and second sliding elements 26, 28, which can also be called guide elements. In particular, one notices the sections 48 and 106, 108 producing springlike effects, which are tantamount to leaf springs.

FIG. 12 a) shows in isometric representation the first sliding element 26, FIG. 12 b) the sliding element 26 in front view, FIG. 12 c) the sliding element 26 in top view, FIG. 12 d) the sliding element 26 in rear view, FIG. 12 e) the sliding element 26 in bottom view and FIG. 12 f) the sliding element 26 in a section along line A-A in FIG. 12 b) and in enlarged representation.

In FIG. 13, a) shows the sliding element 28 in isometric representation, b) a front view of the sliding element 28, c) the sliding element 28 in top view, d) the sliding element in rear view and e) the sliding element 28 in a section along line A-A in FIG. 13 b) in enlarged representation.

What is claimed is:

1. A spirit level (10) comprising:
    a base body (12) with a first measuring sole (52) and a runner element (14) with a second measuring sole (54) being connected to the base body and movable relative to the base body in a longitudinal direction of the base body,
    wherein the first measuring sole and the second measuring sole run at the same level,
    a first sliding element (26) emerging from the base body (12), wherein said first sliding element interacts by form fitting with the runner element (14), for a section, and applies force to the runner in, or approximately in, the normal direction to the measuring soles (52, 54), and
    a second sliding element (28) emerging from the runner, wherein the second sliding element interacts by form fitting with the base body, for a section, and applies force to the runner element in, or approximately in, the normal direction to the measuring soles.

2. The spirit level according to claim 1, wherein the first and the second sliding element (26, 28) each have at least one spring element (48, 106, 108), and/or at least one section with spring properties for the applying of force to the runner element (14) in the normal direction to the measuring soles (52, 54), or approximately in that direction.

3. The spirit level according to claim 2, wherein the at least one spring element, or the at least one section (106, 108) of the second sliding element (28) having a spring action, acts directly on a long leg (92) of a third protrusion (90) which emerges from the base body (12).

4. The spirit level according to claim 3, wherein the at least one spring element, or the at least one section with spring properties (48) of the first sliding element (26) having a spring action, acts directly on a head-side segment of the transverse leg (101) of a fourth protrusion (100) of the runner element (14), and a web-like section (50) of the first sliding element (26) running in the lengthwise direction of the spirit level (10) at a spacing from the spring element, or the section having the spring action bears against the surface (104) side away from the head of the long leg (92) of the head-side third protrusion (90) of the base body (12).

5. The spirit level according to claim 1, wherein a first protrusion (56) emerges from the base body (12), and extends at least in its longitudinal direction, which engages with a second protrusion (68) emerging from the runner element (14), and extending in its longitudinal direction, and a section of the first and/or second sliding element (26, 28) extends at least partly between overlapping regions of the first and second protrusion.

6. The spirit level according to claim 5, wherein a third protrusion (90) emerges from the base body (12), running parallel to the first protrusion (56), which engages with a fourth protrusion (100) running parallel to the second protrusion (68), and emerging from the runner element (14), and a further section of the first and/or second sliding element (26, 28) extends at least partly between overlapping regions of the third and fourth protrusion.

7. The spirit level according to claim 6, wherein an activating element (20) emerges from the base body (12), which is connected to a cam element (82), which runs for a section inside a channel-shaped section of the runner element running in the longitudinal direction of the runner element (14).

8. The spirit level according to claim 7, wherein the activating element (20) is a rotatable cup-shaped element with a handle (25).

9. The spirit level according to claim 8, wherein the handle (25) is configured as a radially extending web.

10. The spirit level according to claim 8, wherein the activating element (20) is recessed for at least a section of the outer wall (18) of the base body (12).

11. The spirit level according to claim 7, wherein, by rotating the activating element (20) through an angle α with $45° \leq \alpha \leq 180°$, the cam element (82) is movable from a position releasing the runner element (14) to a position arresting the runner element.

12. The spirit level according to claim 11, wherein the angle α is $45° \leq \alpha \leq 90°$.

13. The spirit level according to claim 7, wherein the cam element (82) runs for a portion inside the first sliding element (26), and can rotate relative to the first sliding element.

14. The spirit level according to claim 7, wherein long legs of the second and fourth protrusions (68, 100) and facing leg sections of transverse leg (66, 102) of the second and fourth protrusions bound a channel-shaped section receiving of the cam element (82).

15. The spirit level according to claim 6, wherein the first protrusion, or the third protrusion (56, 90), is an L-shaped profile section of the base body (12).

16. The spirit level according to claim 6, wherein the third protrusion, or the first protrusion (90, 56), is a T-shaped profile section of the base body (12) with a transverse leg (96) running parallel to an outer lateral surface (18) of the base body.

17. The spirit level according to claim 6, wherein at least one of the second and the fourth protrusion (68, 100) is a T-shaped profile section of the runner element (14) with a transverse leg (66, 102) running parallel to an outer lateral surface of the runner elements.

18. The spirit level according to claim 17, wherein the transverse leg (66) at the measuring sole side and the long leg of the second protrusion (68), as well as a profile section emerging from the measuring sole (54) of the runner element (14), bound an L-shaped channel, inside which, the first protrusion (56) extends for a section.

19. The spirit level according to claim 6, further comprising a fifth protrusion (103) extending from the runner element (14) in a direction of the base body, and running in a head region of the spirit level (10), resting against an outside of the third protrusion (90) running at the head side.

20. The spirit level according to claim 19, wherein outer surfaces of the fifth protrusion facing each other and running perpendicular to the lateral surfaces (18, 114) of the spirit level, viewed in the vertical axis direction of the spirit level (10), run at a spacing from each other.

21. The spirit level according to claim 6, wherein outer surfaces of the third and fourth protrusions facing each other and running perpendicular to the lateral surfaces (18, 114) of the spirit level, viewed in the vertical axis direction of the spirit level (10), run at a spacing from each other.

22. The spirit level according to claim 5, wherein outer surfaces of the first and second protrusions (56, 68) facing each other and running perpendicular to the lateral surfaces (18, 114) of the spirit level, viewed in the vertical axis direction of the spirit level (10), run at a spacing from each other.

23. The spirit level according to claim 1, wherein a strip-like element (118) extends in a head region of the spirit level (10), which is supported by the base body (12), and closes off any free space present between the runner element (14) and the base body (12).

24. The spirit level according to claim 1, wherein at least one of the first and the second sliding elements (26, 28) is associated with an end stop, or wherein the end stop (112) limits a lengthwise displacement of the runner element (14).

25. The spirit level according to claim 24, wherein a spacer (110) emerges from the runner element (14), which interacts with the end stop (112) emerging from the first sliding element (26), or associated with it at the maximum desired effective length of the spirit level (10).

26. The spirit level according to claim 1, wherein the runner element (14) is connected to an end cap (34) serving as a handle, which can be inserted for a portion into the base body (12) and be pulled out from the base body.

27. A method for producing a spirit level (10) comprising a base body (12) with a first measuring sole (52) and a runner element (14) with a second measuring sole (54) being connected to the base body and movable relative to the base body in a longitudinal direction of the base body, wherein the first and the second measuring soles run at the same level, especially for the producing of a spirit level according to claim 1, wherein the base body (12) and the runner element (14) are assembled first, and then the first and second measuring soles (52, 54) are machined jointly.

28. The method according to claim 27, wherein, during the machining of the measuring soles (52, 54) of the base body (12) and the runner element (14), the measuring soles (52, 54) of the base body (12) and the runner element are oriented flush, or substantially flush, with each other at an end face.

* * * * *